(12) United States Patent
Moore et al.

(10) Patent No.: US 10,974,466 B2
(45) Date of Patent: Apr. 13, 2021

(54) DYNAMIC HEATER CONTROL FOR AUTOMATED FIBER PLACEMENT MACHINES

(71) Applicant: The Boeing Company, Chicago, IL (US)

(72) Inventors: Jeron D Moore, Lynnwood, WA (US); Brice A Johnson, Federal Way, WA (US); Samuel F Pedigo, Lake Forest Park, WA (US); Sayata Ghose, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/287,917

(22) Filed: Feb. 27, 2019

(65) Prior Publication Data

US 2019/0193345 A1 Jun. 27, 2019

Related U.S. Application Data

(62) Division of application No. 15/260,134, filed on Sep. 8, 2016, now Pat. No. 10,252,478.

(51) Int. Cl.
| | | |
|---|---|---|
| *B32B 41/00* | (2006.01) | |
| *B29C 70/38* | (2006.01) | |
| *B29C 70/54* | (2006.01) | |

(52) U.S. Cl.
CPC .......... *B29C 70/384* (2013.01); *B29C 70/382* (2013.01); *B29C 70/54* (2013.01)

(58) Field of Classification Search
CPC ..... B29C 70/384; B29C 70/382; B29C 70/54; G05B 19/4142
USPC .................... 156/60, 64, 350, 351, 378, 379
See application file for complete search history.

(56) References Cited

U.S. PATENT DOCUMENTS

| | | | | |
|---|---|---|---|---|
| 5,447,586 A | * | 9/1995 | Tam | ..................... B29C 53/8041 156/64 |
| 2017/0341314 A1 | * | 11/2017 | Baker | ................. G05B 19/409 |

FOREIGN PATENT DOCUMENTS

| | | |
|---|---|---|
| CN | 101907899 A | 12/2010 |
| CN | 103009637 A | 4/2013 |

OTHER PUBLICATIONS

Chinese Office Action; Application 207105849795; dated Aug. 31, 2020.

* cited by examiner

*Primary Examiner* — Michael N Orlando
*Assistant Examiner* — Joshel Rivera
(74) *Attorney, Agent, or Firm* — Duft & Bornsen, PC

(57) ABSTRACT

Systems and methods are provided for dynamically managing heater position for an Automated Fiber Placement (AFP) machine. One embodiment is a method that includes retrieving distance data indicating predicted distances of a heating surface of a heater of the AFP machine to a surface of a laminate being laid-up by the AFP machine, for each of multiple locations along a path. The method also includes directing the AFP machine to lay up the laminate in accordance with a Numerical Control (NC) program, identifying a current location of the heater in the path, determining a speed at which the heater of the AFP machine is moving, correlating the current location of the heater with a predicted distance, and adjusting an amount of power for the heater at the current location based on the predicted distance that was correlated with the current location, and the speed at the current location.

20 Claims, 11 Drawing Sheets

| LOW SPEED | |
|---|---|
| DISTANCE | POWER (%) |
| 0-1 | 2 |
| 1-5 | 5 |
| 7-12 | 10 |
| 13-20 | 20 |

↑ 910

| HIGH SPEED | |
|---|---|
| DISTANCE | POWER (%) |
| 0-1 | 10 |
| 1-5 | 20 |
| 7-12 | 40 |
| 13-20 | 100 |

↑ 920

DYNAMIC HEATER CONTROL FOR AUTOMATED FIBER PLACEMENT MACHINES

FIELD

The disclosure relates to the field of composite manufacturing, and in particular, to Automated Fiber Placement (AFP) machines.

BACKGROUND

Multi-layer laminates of constituent material (e.g., Carbon Fiber Reinforced Polymer (CFRP)) may be formed into any of a variety of shapes for curing into a composite part. To facilitate the fabrication of composite parts, a robot such as an AFP machine may be utilized. For example, an AFP machine may lay up one or more layers of tows of constituent material that form a laminate which is then cured.

The operations of an AFP machine may be directed by a Numerical Control (NC) program that dictates movements of the AFP machine as tow layup continues. An AFP machine may dispense multiple tows at once onto a laminate in a single course (e.g., a single "run" across a laminate), and an AFP machine may initiate or terminate individual tows within a course in response to instructions from the NC program.

To ensure that tows being placed by an AFP machine properly adhere to the underlying laminate, a heater at the AFP machine heats the laminate. Heating the laminate ensures that the tows will properly adhere to the laminate at a desired level of tack. However, designers of composite parts continue to seek out systems and devices that enhance the heating process and reduce the potential for overheating and/or underheating of the laminate.

SUMMARY

Embodiments described herein dynamically adjust the amount of power applied to a heater of an AFP machine, based on a distance of the heater to an underlying laminate, and a speed at which an end effector/head of the AFP machine is moving. This ensures that the laminate reaches a desired temperature/receives a desired amount of heat, regardless of the actions being performed by the head of the AFP machine during layup. These techniques are particularly beneficial in environments wherein the AFP machine lays up laminates having complex geometries.

One embodiment is a method that includes retrieving distance data indicating predicted distances of a heating surface of a heater of an Automated Fiber Placement (AFP) machine to a surface of a laminate being laid-up by the AFP machine, for each of multiple locations along a path that the heating surface will travel over the laminate surface during layup. The method also includes directing the AFP machine to lay up the laminate in accordance with a Numerical Control (NC) program, identifying a current location of the heater in the path during layup, determining a speed at which the heater of the AFP machine is moving at the current location, correlating the current location of the heater with one of the predicted distances, and adjusting an amount of power for the heater during layup at the current location based on the predicted distance that was correlated with the current location, and the speed at the current location.

A further embodiment is a system comprising an Automated Fiber Placement (AFP) machine that lays up a laminate. The AFP machine includes a head comprising a guide that dispenses tows of constituent material onto the laminate, and a heater that heats the laminate prior to the tows being dispensed onto the laminate. The AFP machine further includes a controller that retrieves distance data indicating predicted distances of a heating surface of the heater to a surface of the laminate for each of multiple locations along a path that the heating surface will travel over the laminate surface during layup, directs the AFP machine to lay up the laminate in accordance with a Numerical Control (NC) program, identifies a current location of the heater in the path during layup, determines a speed at which the heater of the AFP machine is moving at the current location, correlates the current location of the heater with one of the predicted distances, and adjusts an amount of power for the heater during layup at the current location based on the predicted distance that was correlated with the current location, and the speed at the current location.

A further embodiment is a method that includes acquiring distance data from at least one sensor, determining a distance of a heating surface of a heater of an Automated Fiber Placement (AFP) machine to a surface of a laminate being laid-up by the AFP machine at a location, based on the distance data, determining a speed of the heater over the laminate, and adjusting an amount of power for the heater based on the distance and the speed at the location.

A further embodiment is a system that includes an AFP machine. The AFP machine includes a head that comprises a guide that dispenses tows of constituent material onto a laminate, a heater that heats a surface of the laminate prior to the tows being dispensed onto the laminate, and at least one sensor that provides distance data. The AFP machine further includes a controller that directs the AFP machine to lay up the laminate in accordance with a Numerical Control (NC) program, determines a speed at which the heater of the AFP machine is moving during layup, determines a distance of the heating surface to the laminate surface at a location based on the distance data from the at least one sensor, and adjusts an amount of power for the heater based on the distance and the speed at the location.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
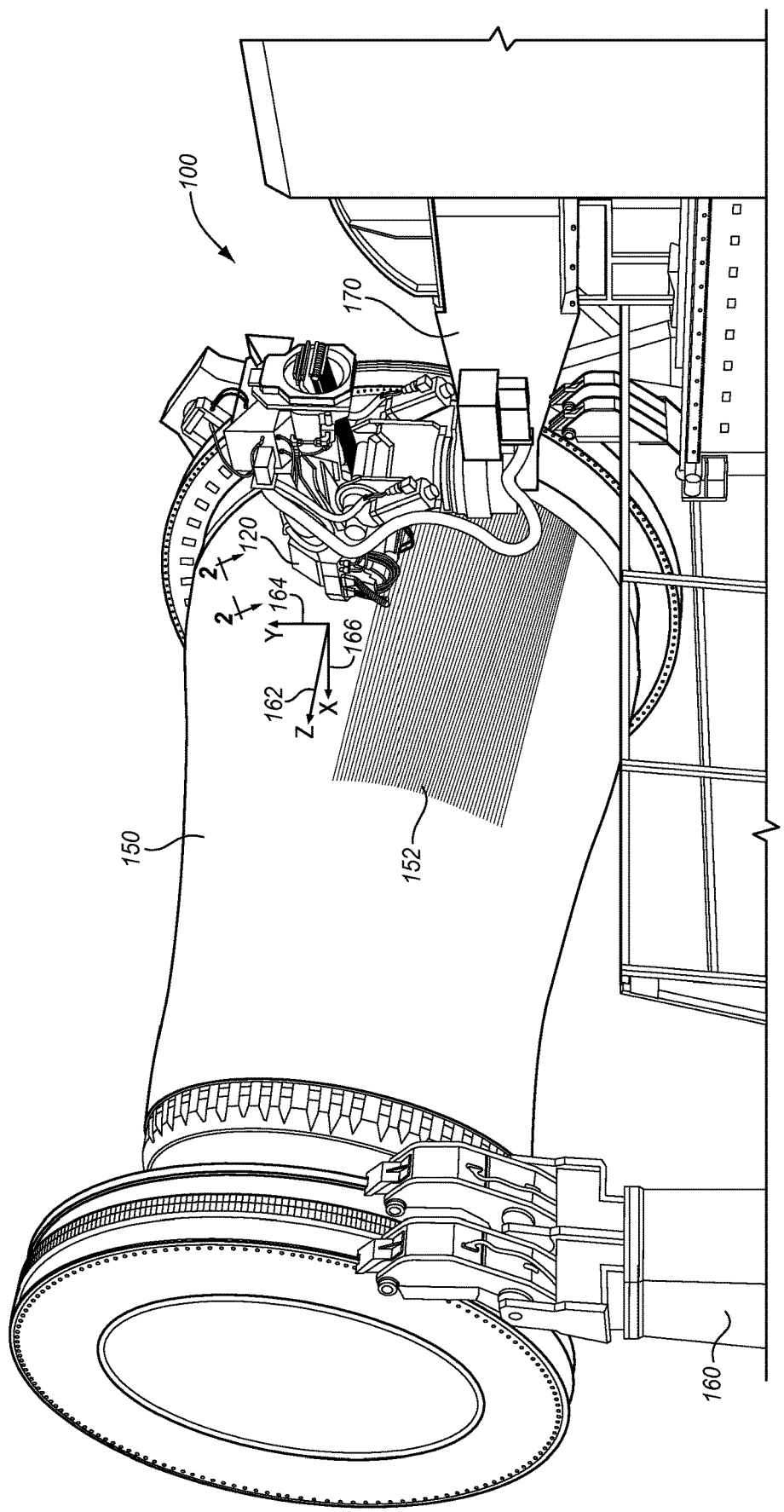
FIG. 1 is a diagram illustrating an AFP machine that lays up tows of material in an exemplary embodiment.

FIG. 1 is a diagram illustrating an AFP machine 100 that is mounted to a support 170 in an exemplary embodiment. AFP machine 100 comprises any system or device capable of laying up tows 152 of constituent material for curing into a composite part. AFP machine 100 includes end effector/head 200, which dispenses tows 152 of curable constituent material (e.g., CFRP) during layup (e.g., concurrently). Tows 152 are laid-up to form laminate 150, which comprises one or more layers of material that will be cured into a single monolithic composite part. In this embodiment, laminate 150 comprises a fuselage section for an aircraft, and is held in place by rotational holder 160.

As AFP machine 100 operates to lay up tows 152 onto laminate 150, AFP machine 100 may move directly towards/away from laminate 150 along axis X 166, vertically upwards/downwards along axis Y 164, and/or laterally along axis Z 162. As used herein, when AFP machine 100 lays up multiple tows 152 concurrently during a single "sweep" of head 200, those tows 122 are collectively referred to as a single "course." A set of courses that are applied consecutively may be referred to as a layer. As layers are added to laminate 150, the strength of the resulting composite part is beneficially enhanced.

Laying up material for a large laminate 150 such as a section of fuselage is a time-consuming and complex process. In order to ensure that tows 152 are laid-up quickly and efficiently, the operations of AFP machine 100 are controlled by an NC program. In one embodiment, the NC program provides instructions on a course-by-course basis for aligning/repositioning AFP machine 100, moving head 200, and laying up tows 152 onto laminate 150. In this manner, by performing the instructions in the NC program, AFP machine 100 fabricates a laminate for curing into a composite part.

Figure 2:
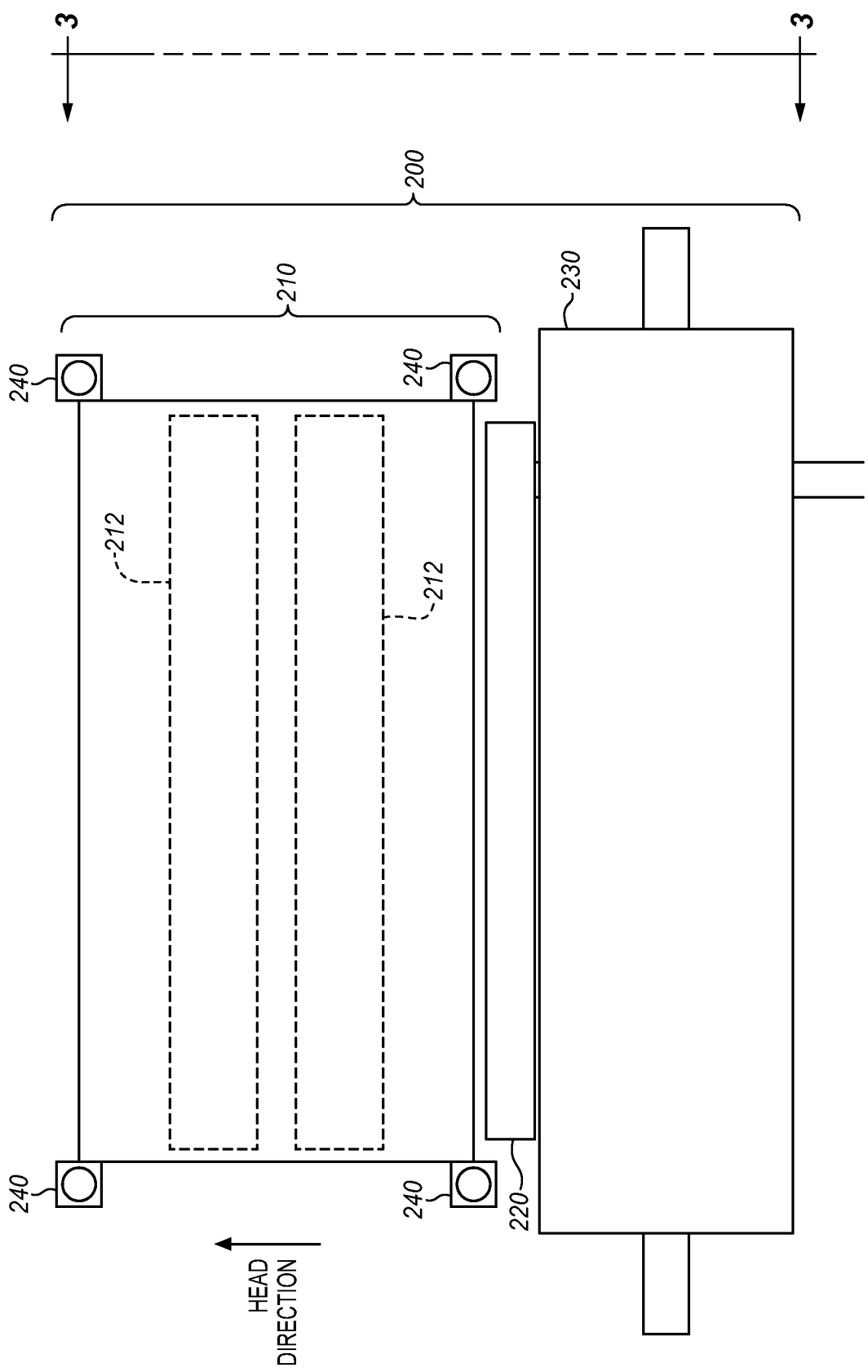
FIG. 2 is a zoomed in view of an end effector of a robot in an exemplary embodiment.

FIG. 2 is a zoomed in front view of head 200 of AFP machine 100, as indicated by view arrows 2 of FIG. 1. As shown in FIG. 2, head 200 includes heater 210, which applies heat to laminate 150 in order to ensure that tows 152 tack/adhere properly to laminate 150. Heater 210 applies power to heating elements 212 (e.g., electrically resistive filaments that generate thermal/infrared radiation in response to applied current) in order to radiate heat onto laminate 150. In this embodiment, heater 210 is accompanied by sensors 240, which measure distances from heater 210 to laminate 150 as heater 210 proceeds in the indicated head direction while tows 152 are being laid-up. FIG. 2 further illustrates that head 200 includes guide 220 for dispensing one or more tows 152, as well as compaction roller 230, which compresses tows 152 onto laminate 150.

Figure 3:
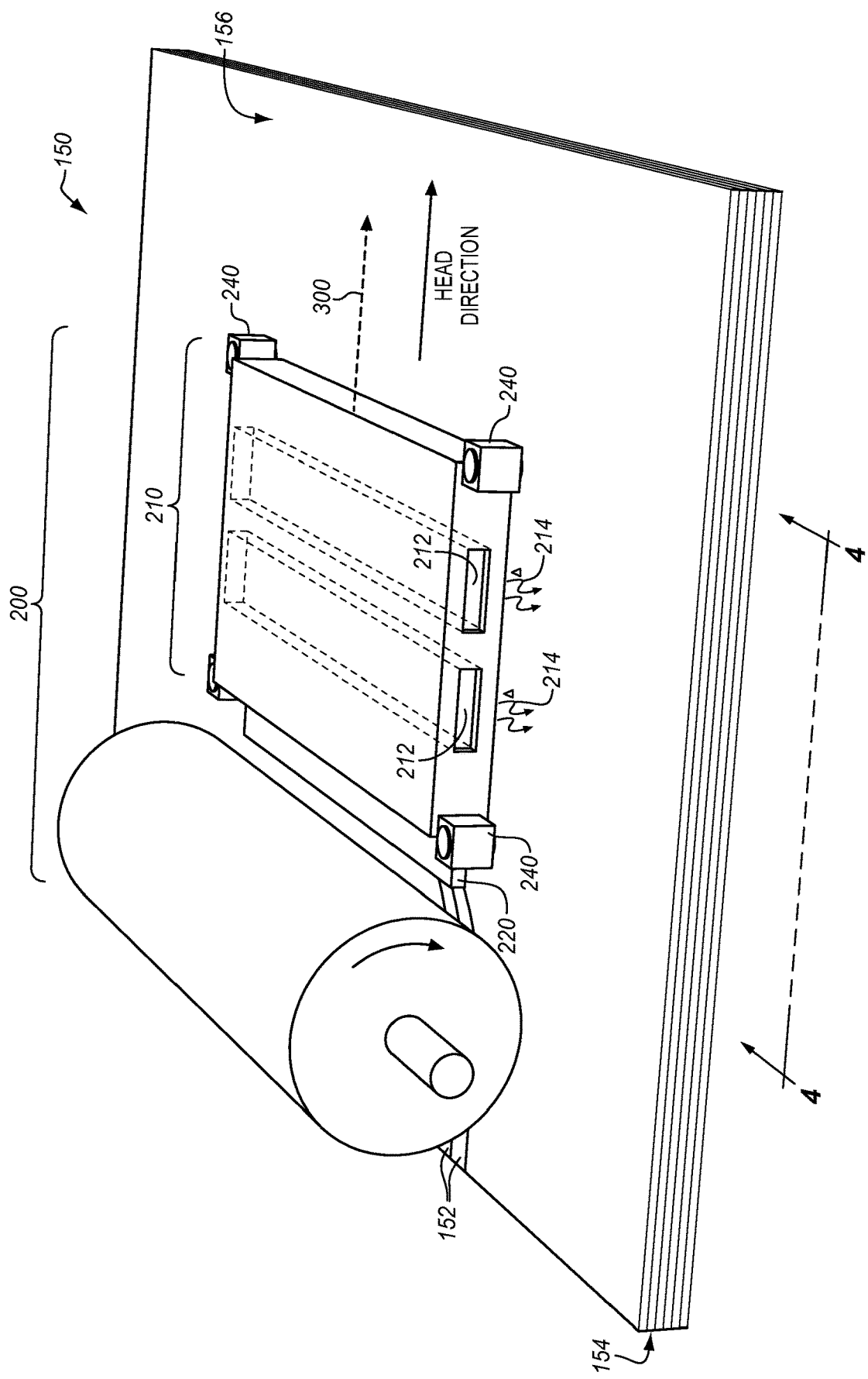
FIG. 3 is a perspective view of an end effector laying-up tows of constituent material in an exemplary embodiment.

FIG. 3 is a perspective view illustrating the application of tows 152 onto laminate 150 by head 200 in an exemplary embodiment. Specifically, FIG. 3 illustrates the view indicated by view arrows 3 of FIG. 2. As shown in FIG. 3, head 200 includes sensors 240, heater 210 (including heating elements 212), guide 220, and compaction roller 230. Head 200 proceeds along path 300 over laminate 150 in the indicated head direction, laying up tows 152 for compaction onto laminate 150. As head 200 dispenses multiple tows 152 concurrently during a course, compaction roller 230 presses tows 152 onto surface 156 of laminate 150, forming layers 154. FIG. 3 further illustrates that heater 210 precedes guide 220 which dispenses tows 152. Thus, heater 210 applies heat 214 to laminate 150 in order to prepare laminate 150 for receiving tows 152 (e.g., instead of directly heating tows 152). This provides a substantial benefit in that it helps to ensure that laminate 150 is heated to a desired temperature. This heat applied to laminate 150 may in turn help to heat tows 152 to a desired temperature after tows 152 come into contact with/are compacted onto laminate 150. At the same time, because heater 210 precedes tows 152 and compaction roller 230, this ensures that tows 152 are not heated before they come into contact with compaction roller 230. Such an outcome could undesirably cause tows 152 to adhere to compaction roller 230 instead of laminate 150.

Figure 4:
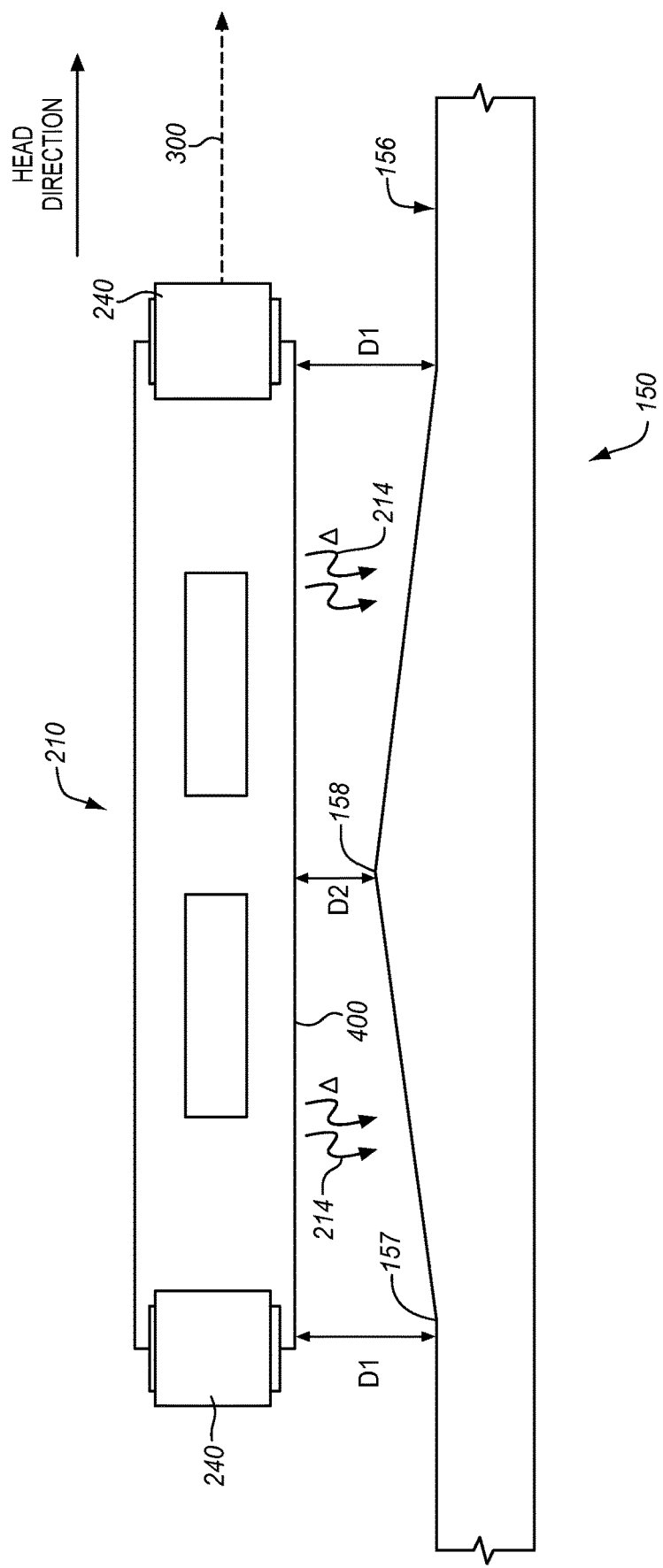
FIG. 4 is a side view of a heater in an exemplary embodiment.

FIG. 4 is a side view of heater 210 indicated by view arrows 4 of FIG. 3. FIG. 4 illustrates a heating surface 400 (e.g., a glass or plastic face) via which heat is radiated onto laminate 150 from heater 210. In this embodiment, heating surface 400 is a plane at a lowermost portion of heater 210, although heating surface 400 may comprise a surface of any arbitrary shape through which radiant heat is transferred to laminate 150 from heater 210. FIG. 4 illustrates that, for a non-uniform surface 156 of laminate 150, the distance between heating surface 400 of heater 210 and surface 156 of laminate 150 may vary. This is true even when heater 210 is held perfectly even/level as shown in FIG. 4. Thus, even though heater 210 is shown at a distance D1 from surface 156 at point/location 157, heater 210 is at a much shorter distance D2 from surface 156 at point/location 158. This may present a problem because radiant heat drops off as a squared function of distance. Thus, if heater 210 applies a constant amount of heat and moves at a constant speed across laminate 150, it may overheat point 158 or underheat point 157. AFP machine 100 beneficially addresses this concern, by dynamically varying the amount of power for heater 210 in order to reduce overheating and underheating.

Figure 5:
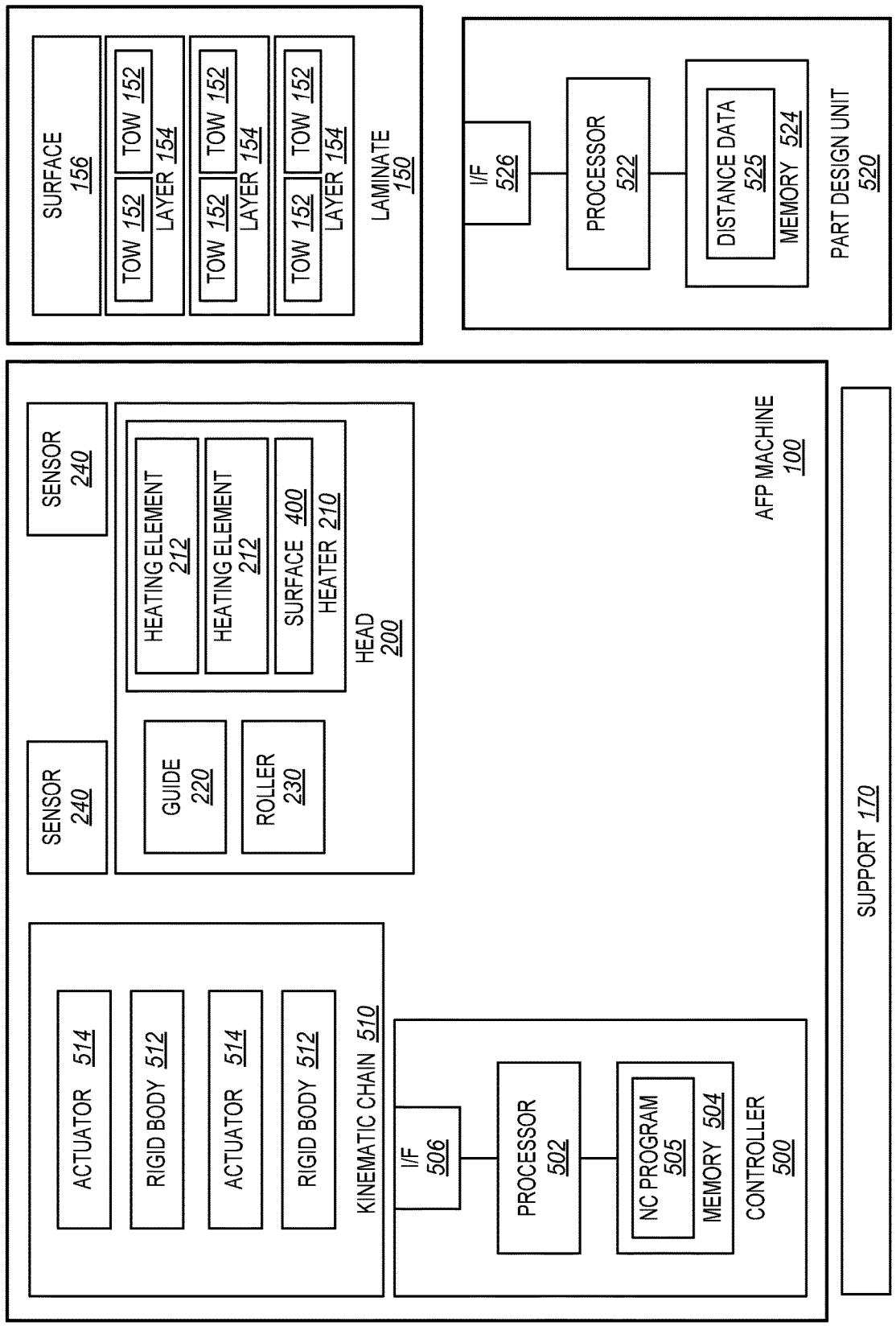
FIG. 5 is a block diagram of an AFP machine that lays up a laminate in an exemplary embodiment.

FIG. 5 is a block diagram illustrating further components which may be utilized with AFP machine 100. Specifically, FIG. 5 illustrates that AFP machine 100 may include controller 500, which manages the operations of AFP machine 100 in accordance with an NC program 505 in memory 504. For example, processor 502 of controller 500 may utilize instructions in NC program 505 to direct the operations of actuators 514 (e.g., rotational or extensional actuators) at kinematic chain 510 of AFP machine 100. Controller 500 may utilize interface (I/F) 506 (e.g., an Ethernet cable, Universal Serial Bus (USB) cable, a transceiver utilizing an Institute of Electrical and Electronics Engineers IEEE 802.11 wireless protocol, etc.) to transmit instructions to and receive feedback from actuators 514. In this manner, the positions of rigid bodies 512 may be changed by controller 500, moving head 200 across laminate 150 in order to dispense tows or reposition head 200 to start a new course. Controller 500 may be implemented, for example, as custom circuitry, as a processor executing programmed instructions, or some combination thereof.

FIG. 5 further illustrates that AFP machine 100 is held by support 170, and shows sensors 240, guide 220 which dispenses tows 152, and roller 230 which compacts tows 152. Heating elements 212 and heating surface 400 are also illustrated in FIG. 5. FIG. 5 further illustrates laminate 150, which comprises multiple layers 154 of tows 152, as well as surface 156.

Part design unit 520 is also illustrated in FIG. 5. Part design unit 520 generates layup instructions for laying-up laminate 150, which will be cured into a composite part. Part design unit 520 may be utilized, for example, to generate an NC program such as NC program 505. Part design unit 520 has access to the geometry of surface 156 of laminate 150 (e.g., the surface geometry of laminate 150 after/as each layer is applied to laminate 150). Given this a priori knowledge of the geometry of laminate 150 during layup, part design unit 520 may predict a distance of heater 210 to surface 156 for each of multiple locations at which head will lay up tows 152 onto laminate 150 (e.g., on a layer-by-layer basis). Part design unit 520 may therefore generate distance data 525 indicating one or more predicted distances (e.g., an average predicted distance, maximum predicted distance, and/or minimum predicted distance) between heating surface 400 and laminate surface 156 at each location along the path. As shown in FIG. 5, part design unit 520 includes processor 522, memory 524, and interface (I/F) 526 (e.g., an Ethernet or wireless interface).

Figure 6:
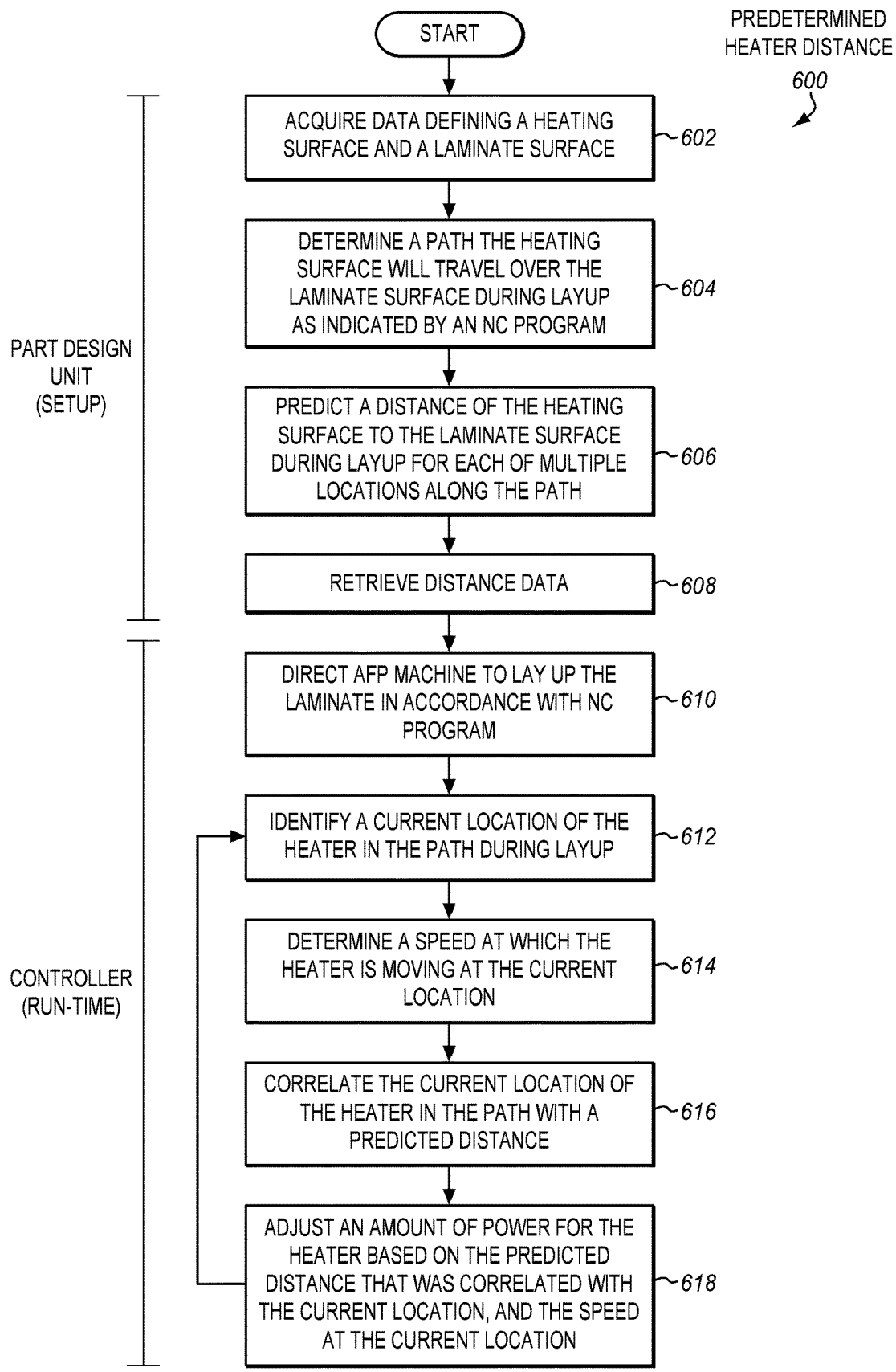
FIG. 6 is a flow chart illustrating a method of dynamically adjusting power for a heater, based on predetermined information indicating distance of the heater to a laminate in an exemplary embodiment.
Figure 7:
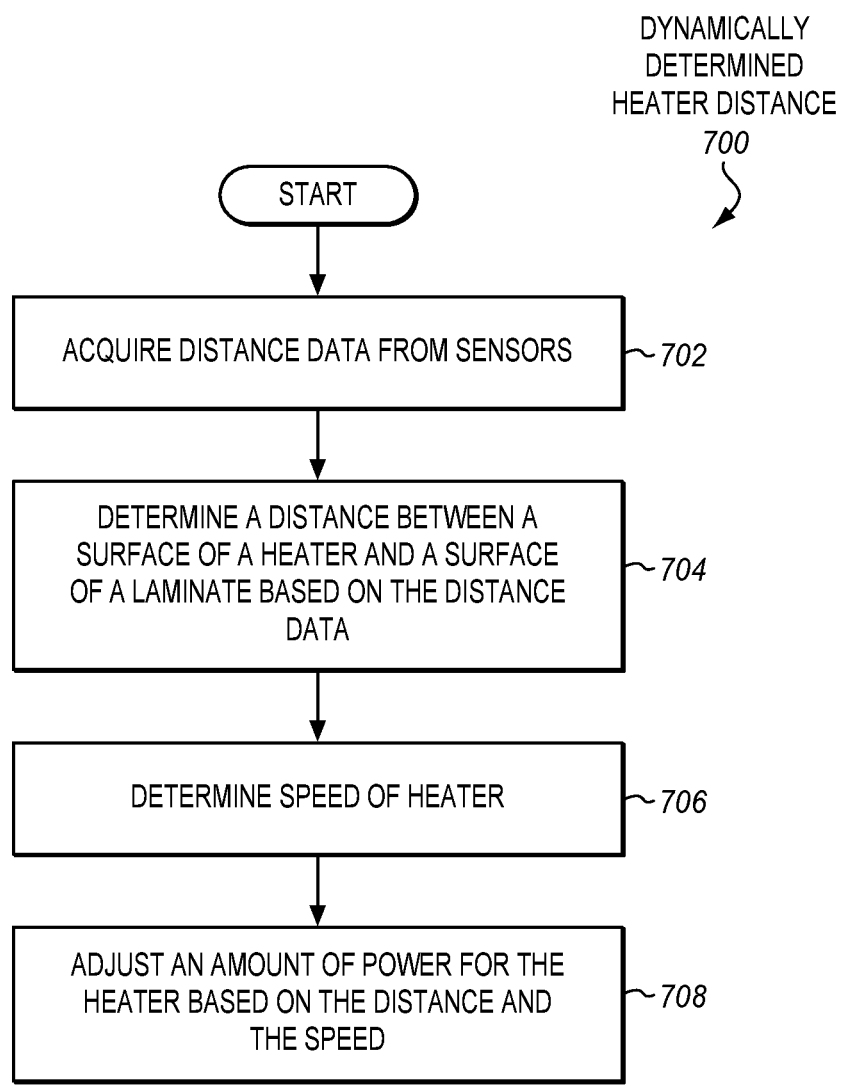
FIG. 7 is a flow chart illustrating a method of dynamically adjusting power for a heater, based on sensor input indicating distance of the heater to a laminate in an exemplary embodiment.

Illustrative details of the operation of AFP machine 100 will be discussed with regard to FIGS. 6-7. Specifically, FIG. 6 illustrates a method for utilizing pre-determined distance data to regulate power for heater 210, while FIG. 7 illustrates a method for utilizing live sensor data (e.g., from sensors 240) to regulate power for heater 210. Assume, for FIG. 6, that a composite part is being designed as a series of instructions in NC program 505. Each set of instructions indicates a start location for head 200, an orientation/angle of head 200, a course to travel via head 200 in a direction indicated by the orientation, and information indicating where tows 152 should be dispensed and/or cut as head 200 continues along the course.

FIG. 6 is a flow chart illustrating a method 600 of dynamically adjusting power for heater 210, based on pre-determined information indicating a distance of heater 210 to laminate 150 in an exemplary embodiment. That is, method 600 predictively determines the distance of heater 210 to surface 156 of laminate 150, based on instructions provided in an NC program (e.g., NC program 505) for directing AFP machine 100.

The steps of method 600 are described with reference to AFP machine 100 of FIG. 1 (and as further illustrated in FIG. 5), but those skilled in the art will appreciate that method 600 may be performed in other systems. The steps of the flowcharts described herein are not all inclusive and may include other steps not shown. The steps described herein may also be performed in an alternative order.

In step 602, part design unit 520 proceeds to acquire data defining heating surface 400 and laminate surface 156 (step 602). The data defining heating surface 400 and laminate surface 156 may comprise three dimensional (3D) models of these features (e.g., as indicated by a Computer Aided Design (CAD) file). Based on this information, part design unit 520 may generate an NC program defining how to lay up laminate 150, or otherwise identify how heating surface 400 and laminate surface 156 will move in a shared space/shared coordinate system during layup. Part design unit 520 further identifies a path (e.g., path 300) which heating surface 400 follows across laminate surface 156 during layup (step 604). The path may define the position of heater 210 at multiple locations as heater 210 moves across laminate surface 156 (e.g., corresponding to a course). With the path known, part design unit 520 programmatically predicts the distance of heating surface 400 to laminate surface 156 during layup for each of multiple locations along the path of head 200. For example, in a multi-layer laminate, part design unit 520 may identify a path for each course traveled by head 200 to layup a layer, and predicts one or more distances between heating surface 400 and laminate surface 156 at each of multiple locations along each path. This distance information may then be aggregated by part design unit 520 in order to predictively determine what the distances (e.g., average distance, minimum distance, maximum distance) will be between heating surface 400 and laminate surface 156 throughout the layup process. This is referred to in FIG. 5 as distance data 525.

After part design unit 520 has generated an NC program 505 and/or acquired distance data 525 for use by AFP machine 100, controller 500 of AFP machine 100 retrieves NC program 505 and distance data 525, storing both in memory 504 (step 608). Controller 500 further directs actuators 514 to reposition head 200, and directs head 200 to lay up tows 152 onto surface 156 in order to fabricate laminate 150 in accordance with NC program 505 (step 610). As each layer is laid-up, laminate 150 increases in size.

In order to dynamically regulate the temperature of laminate surface 156 to reach a desired range of temperatures (e.g., temperatures between a lower bound and a upper bound) at each of multiple locations along the path, controller 500 identifies a current location of heater 200 in the path during layup (step 612). The current location along the path may be determined based on the instruction from NC program 505 that is being performed by AFP machine 100, in addition to feedback from actuators 514 indicating the progress of AFP machine 100 in completing the instruction. Next, controller 500 determines (during layup) a speed at which heater 210 is moving across laminate surface 156 at the current location (step 614). The amount of heat applied to laminate surface 156 by heater 210 is a squared function of distance between heating surface 400 and laminate surface 156, as well as an amount of time that heating surface 400 remains over laminate surface 156. Thus, by determining the speed of heater 210 at the current location (e.g., as indicated by input from actuators 514, head 200, and/or instructions in NC program 505), controller 500 may regulate the amount of heat applied to locations on laminate 156. Note that the speed of heater 210 may vary. That is, head 200 may start at a slow speed when starting a course, ramp up to a maximum speed, and then slow down at the end of the course in order to facilitate layup processes while moving in an efficient manner. During layup, controller 500 correlates the current location of heater 210 in the path with one of the predicted distances from step 606 (step 616). In this manner, controller 500 determines a distance of heating surface 400 to laminate surface 156, based on a location of heater 210 in the path defined by NC program 505.

Based on both the distance of heating surface 400 to laminate surface 156, as well as the speed at which heater 210 is moving during layup, an amount of heat flux applied to a location at laminate surface 156 by heater 210 may be determined. Hence, during layup controller 500 selects an amount of power for heater 210 (e.g., an amount of power to apply to heater 210, or an amount of power to be radiated as heat by heater 210) based on the predicted distance that was correlated with the current location, as well as the speed at the current location (step 616). For example, this step may involve accessing a heating profile that includes predefined values for power, based on distance and speed. In a further example, this step may involve dynamically calculating a power to apply for heater 210, based on a formula. Furthermore, criteria for heating laminate 150 may indicate a range of desired temperatures, as well as an upper and lower bound.

If a portion of laminate 150 reaches too high of a temperature, laminate 150 may start to harden and locally cure (e.g., in embodiments where laminate 150 includes a thermoset resin), which is undesirable. Hence, controller 500 may limit the amount of power applied by heater 210, depending on the minimum distance (e.g., the minimum shortest path distance) between heating surface 400 and laminate surface 156, in order to ensure that no portion of laminate 150 exceeds the upper bound temperature. This may occur even though it causes other portions of laminate surface 156 to remain below a desired lower bound temperature. Steps 612-616 may be repeated continuously as heater 210 continues along the path, thereby ensuring that surface 156 is uniformly heated at each of multiple locations and facilitating tack as tows are laid-up.

Figures 8, 9:
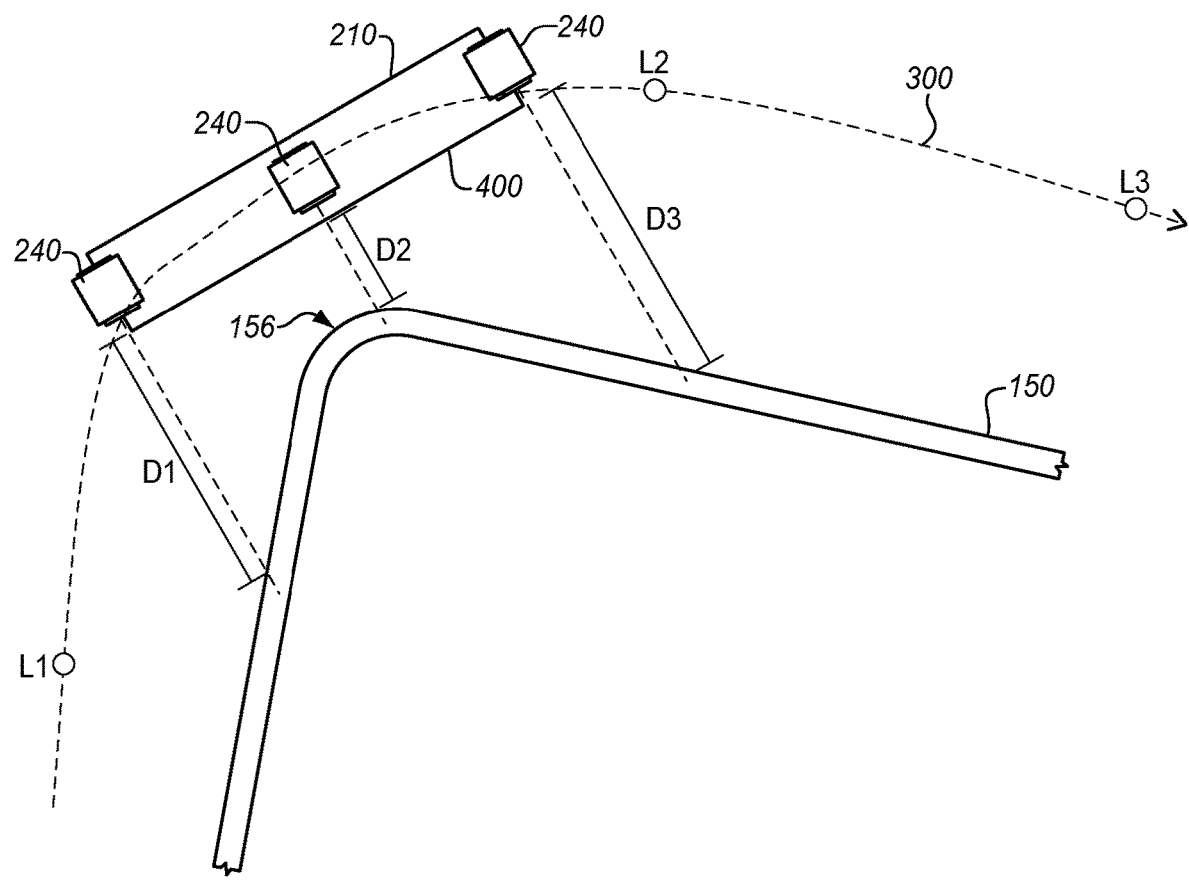
FIG. 8 is a side view of a heater measuring distance to a laminate in an exemplary embodiment.
FIG. 9 illustrates tables that are defined for power profiles in an exemplary embodiment.

FIG. 7 illustrates an alternate method 700 for dynamically adjusting the amount of power applied by heater 210 to laminate 150. Specifically, method 700 focuses upon an embodiment where head 200 includes sensors 240 for tracking distance between heater 210 and laminate 150. Assume, for this embodiment, that AFP machine 100 is actively laying up tows 152 in accordance with NC program 505. As head 200 continues moving along a path defined by NC program 505 at a desired (and varying) speed set by controller 500, controller 500 acquires distance data from sensors 240. In this embodiment, distance data comprises one or more measurements of distance from sensors 240 to laminate surface 156 at a specific location along the path being traveled by head 200. For example, as shown in FIG. 8, a distance may be acquired by each sensor 240, in order to determine distances D1, D2, and D3. The distance data may be acquired at each of multiple locations (e.g., L1, L2, L3) along path 300 over time, and the distance data for each location may be processed to convert each of the measured distances into a distance between heating surface 400 and laminate surface 156. For example, if sensors 240 are offset from heating surface 400, or angled in a particular manner, controller 500 may convert the distance data to accurately indicate distances between heating surface 400 and laminate surface 156.

This distance data may further be analyzed and/or processed by controller 500, in order to determine an average distance (e.g., mean or median), minimum distance, and/or maximum distance between heating surface 400 and laminate surface 156. Controller 500 further determines a speed at which heater 210 is moving across laminate 150 (step 706), for example, based on input from actuators 514 and/or instructions in NC program 505. Then, controller 500 selects an amount of power for heater 210 based on the speed and distance (step 708). This process may be performed in a similar fashion to step 616 of FIG. 6

Utilizing methods 600 and 700, the amount of heat applied by a heater of an AFP machine may beneficially be regulated dynamically in order to account for changes in surface geometry of a laminate being heated. This ensures that the laminate is uniformly heated even in circumstances where the distance and speed of the heater with respect to the laminate vary over time. This may further ensure that laminate 150 is not overheated to the point where curing would locally begin.

EXAMPLES

Figure 10:
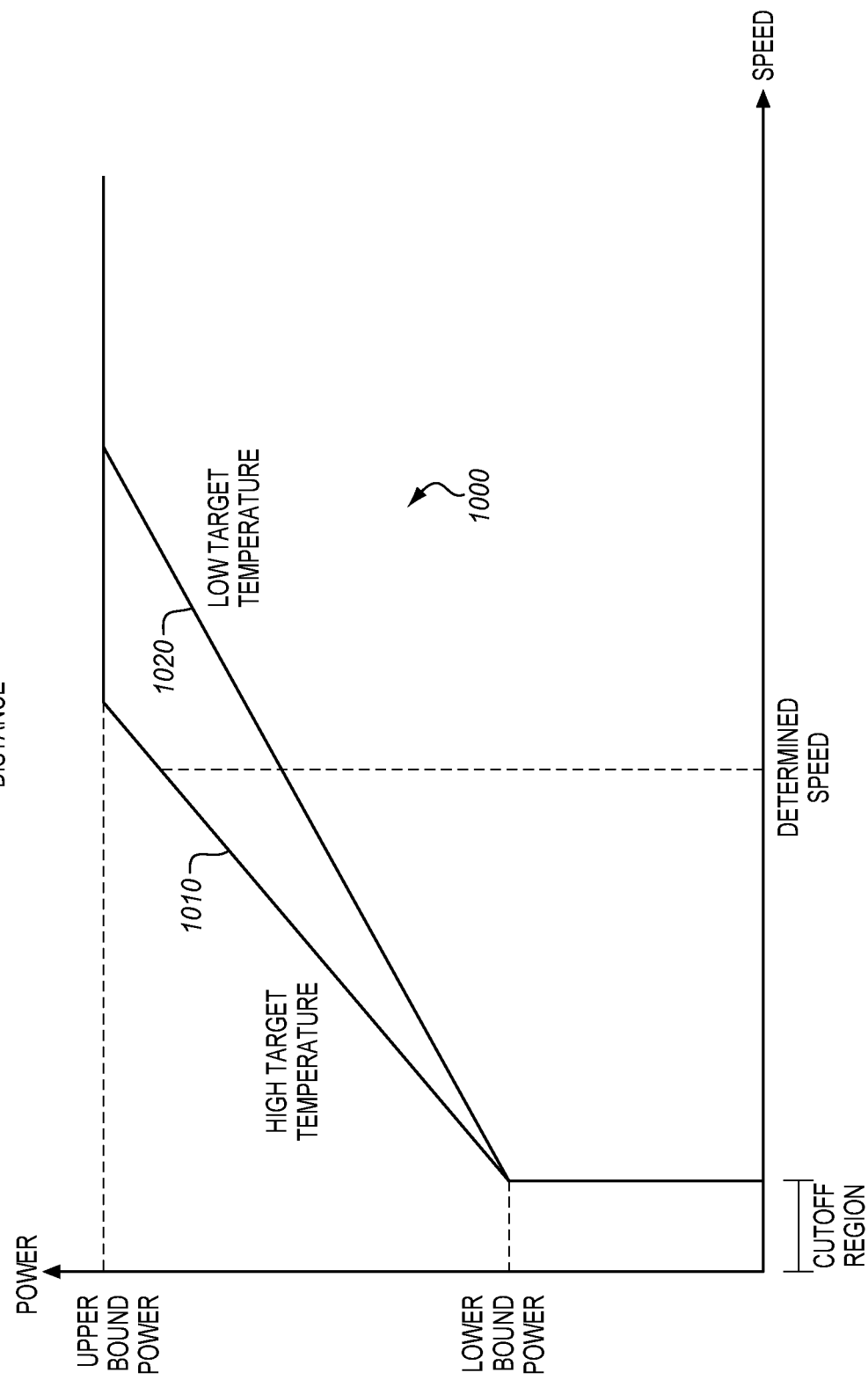
FIGS. 10-11 are graphs that illustrate power profiles for a variety of temperatures and distances in an exemplary embodiment.
Figure 11:
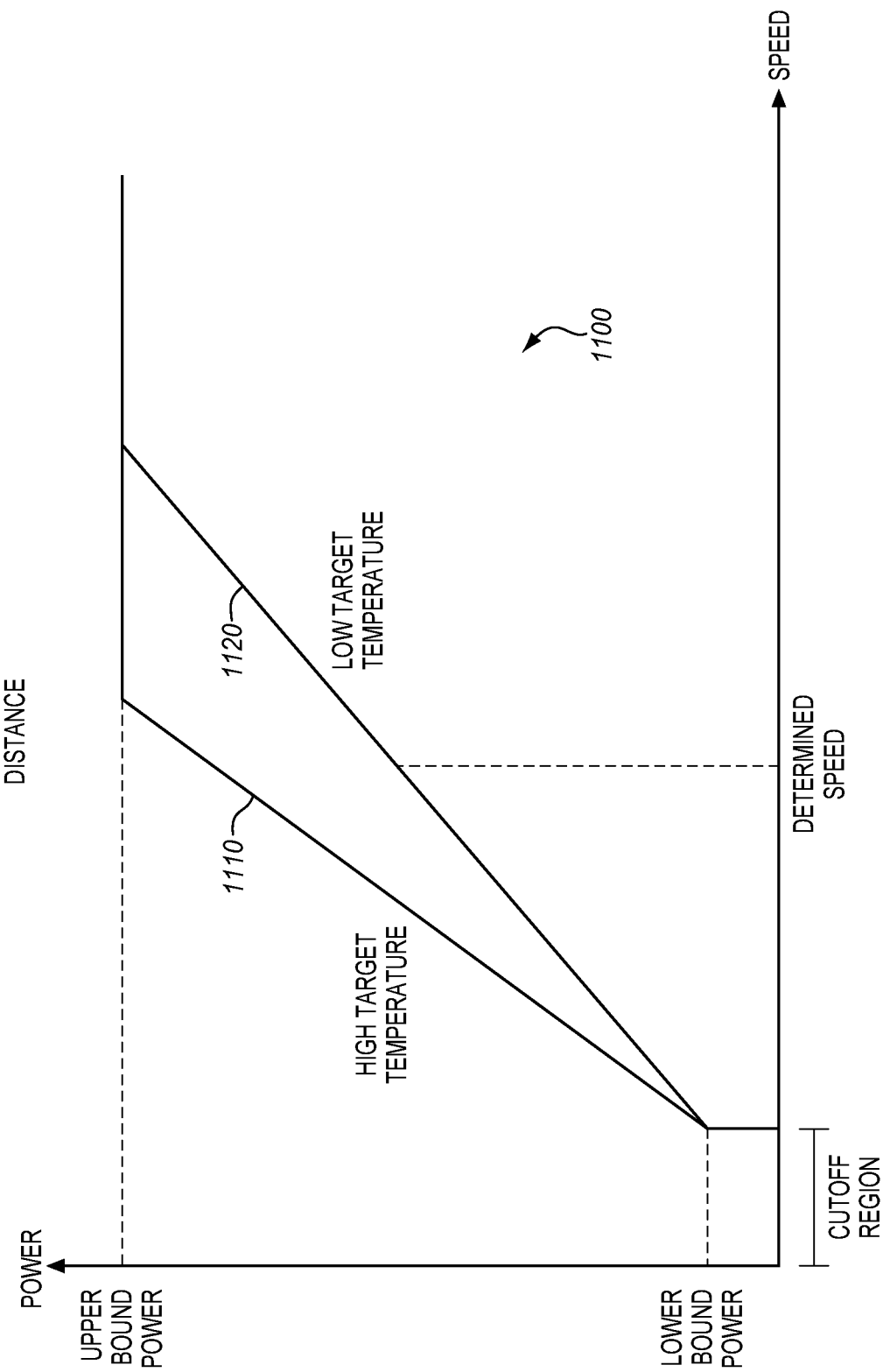

In the following examples, additional processes, systems, and methods are described in the context of power/heating profiles that may be utilized by an AFP machine 100. Specifically, FIGS. 9-11 illustrate examples of power profiles that may be utilized to regulate an amount of power for heating element 212 of FIG. 2. Thus, the power profiles discussed herein may be utilized by a controller 500 to ensure controller 500 selects an amount of power that applies a predetermined amount of heat to laminate 150, or heats laminate 150 to a predetermined temperature, regardless of distance between heating surface 400 and laminate surface 156.

FIG. 9 illustrates power profiles (910, 920) in an exemplary embodiment. Specifically, FIG. 9 illustrates an embodiment where each power profile (910, 920) is associated with a different range of speeds of heater 210, and each power profile (910, 920) includes predefined values for amounts of power to apply to heater 210, based on the distance of heating surface 400 to laminate surface 156.

FIGS. 10-11 are graphs that illustrate power profiles for a variety of temperatures and distances in an exemplary embodiment. Power profile 1000 of FIG. 10 corresponds with a long distance between heating surface 400 and laminate surface 156. Power profile 1000 differs from the power profiles shown in FIG. 9, in that profile 1000 includes multiple piecewise linear functions 1010 and 1020, which each correspond with a different desired target temperature, and are based on a function of speed. Profile 1000 further includes a cutoff region based on the speed of heater 210, such that below a certain level of speed, no power will be applied to heater 210. This ensures that at lower speeds, heater 210 will not apply cumulative amounts of heat that cause laminate 150 to cure. In a similar fashion to FIG. 10, FIG. 11 illustrates power profile 1100, which corresponds with a short distance between heating surface 400 and laminate surface 156, and further includes piecewise functions 1110 and 1120. The cutoff region of FIG. 11 corresponds with a larger range of speeds, and furthermore, the linear functions 1110 and 1120 exhibit steeper slopes such that power increases more quickly as a function of speed. In further embodiments, power for heater 210 is selected/capped (e.g., below a desired level) based on the minimum distance of heating surface 400 to laminate surface 156 in order to prevent unintentional curing of laminate 150. In this manner, power applied to a heating element 212 may be limited, based on the minimum distance between heating surface 400 and laminate surface 156.

Figure 12:
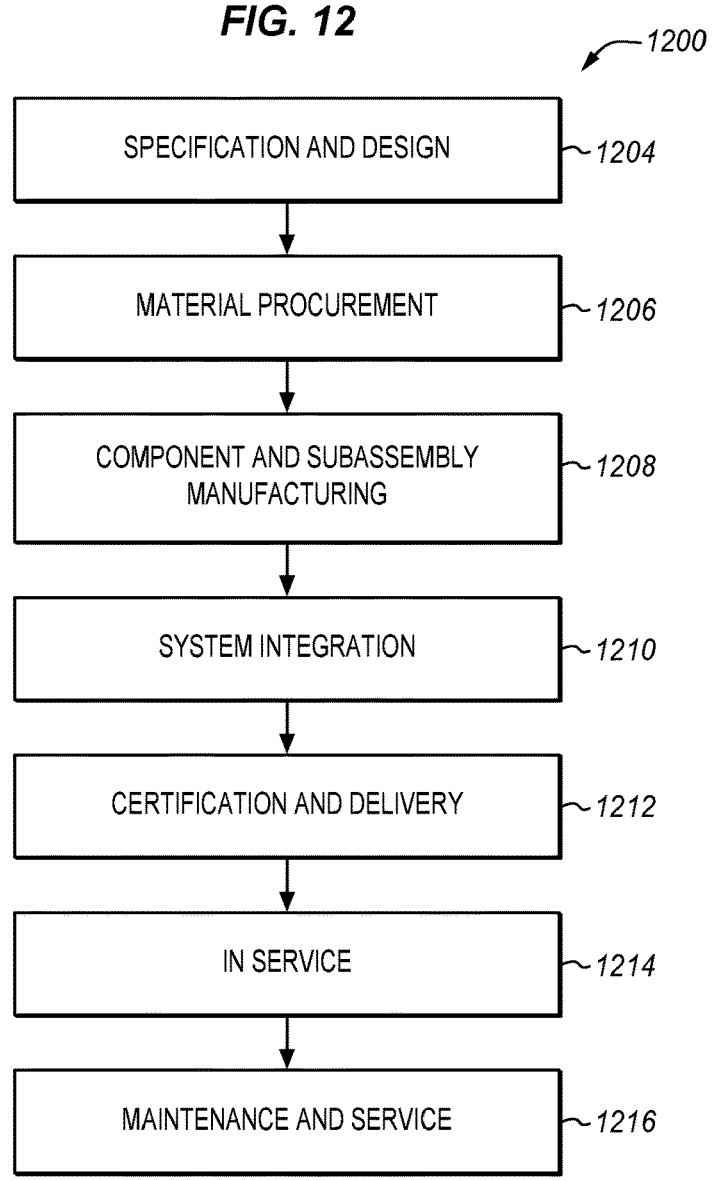
FIG. 12 is a flow diagram of aircraft production and service methodology in an exemplary embodiment.
Figure 13:
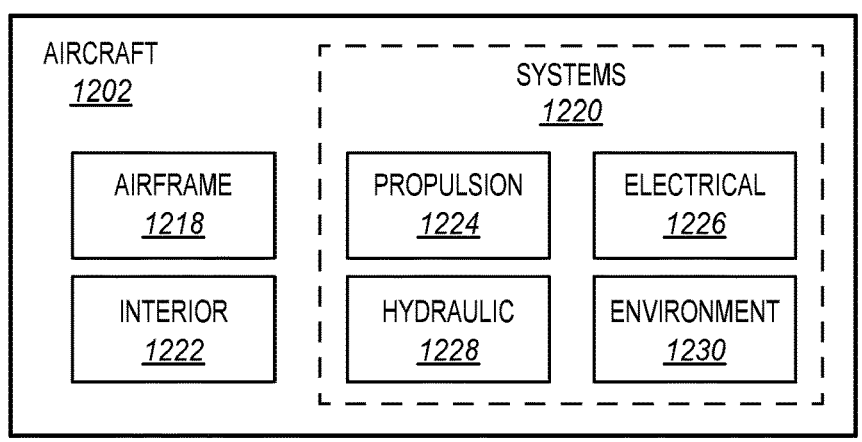
FIG. 13 is a block diagram of an aircraft in an exemplary embodiment.

Referring more particularly to the drawings, embodiments of the disclosure may be described in the context of an aircraft manufacturing and service method 1200 as shown in FIG. 12 and an aircraft 1202 as shown in FIG. 13. During pre-production, exemplary method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 (which may also include modification, reconfiguration, refurbishment, and so on). Apparatus and methods embodied herein may be employed during any one or more suitable stages of the production and service method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion 1224, electrical 1226, hydraulic 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1200. For example, components or subassemblies corresponding to production stage 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216. For example, the techniques and systems described herein may be used for steps 1206, 1208, 1210, 1214, and/or 1216, and/or may be used for airframe 1218 and/or interior 1222. These techniques and systems may even be utilized for systems 1220, including for example propulsion 1224, electrical 1226, hydraulic 1228, and/or environmental 1230.

In one embodiment, AFP machine 100 lays up laminates during component and subassembly manufacturing 1208, which are cured into composite parts that comprise a portion of airframe 118. These composite parts may then be assembled into an aircraft in system integration 1210, and then be utilized in service 1214 until wear renders these parts unusable. Then, in maintenance and service 1216, parts may be discarded and replaced with a newly manufactured part laid-up by AFP machine 100. Heater 210 may be utilized throughout component and subassembly manufacturing 1208 in order to facilitate the layup performed by AFP machine 100.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A system comprising:
an Automated Fiber Placement (AFP) machine that lays up a laminate, the AFP machine comprising:
a head comprising:
a guide that dispenses tows of constituent material onto the laminate; and
a heater that heats the laminate prior to the tows being dispensed onto the laminate; and
a controller that is configured to retrieve distance data indicating predicted distances of a heating surface of the heater to a surface of the laminate for each of multiple locations along a path that the heating surface will travel over the laminate surface during layup, direct the AFP machine to lay up the laminate in accordance with a Numerical Control (NC) program, identify a current location of the heater in the path during layup, determine a speed at which the heater of the AFP machine is moving at the current location, correlate the current location of the heater with one of the predicted distances, and adjust an amount of power for the heater during layup at the current location based on the predicted distance that was correlated with the current location, and the speed at the current location.

2. The system of claim 1 further comprising:
a part design unit comprising:
   a memory; and
   a processor that generates the NC program for directing the AFP machine, determines the path that the heating surface will travel over the laminate surface, predicts distances of the heating surface to the laminate surface for each of the multiple locations along the path, and stores the predicted distances in memory as the distance data.

3. The system of claim 1 wherein:
the controller is configured to identify an average distance of the heating surface to the laminate surface at the location, and select the amount of power based on the average distance.

4. The system of claim 1 wherein:
the controller is configured to identify a minimum distance of the heating surface to the laminate surface at the location, and select the amount of power based on the minimum distance.

5. The system of claim 1 wherein:
the controller is configured to adjust the amount of power to provide a predetermined amount of heat to the laminate surface, regardless of distance between the heating surface and the laminate surface.

6. The system of claim 1 wherein:
the controller is configured to adjust the amount of power to heat the laminate surface to a predetermined temperature, regardless of distance between the heating surface and the laminate surface.

7. The system of claim 1 wherein:
the AFP machine further comprises a compaction roller that compacts tows onto the laminate.

8. The system of claim 1 wherein:
the heater comprises electrically resistive filaments that generate infrared radiation in response to applied current.

9. The system of claim 1 wherein:
the heater comprises a heating surface via which heat is radiated.

10. The system of claim 1 wherein:
the controller-is configured to access a heating profile that includes predefined values for the amount of power, based on distance and speed.

11. A system comprising:
an AFP machine comprising:
   a head comprising:
      a guide that dispenses tows of constituent material onto a laminate;
      a heater that heats a surface of the laminate prior to the tows being dispensed onto the laminate; and
      at least one sensor that provides distance data; and
   a controller that is configured to direct the AFP machine to lay up the laminate in accordance with a Numerical Control (NC) program, determine a speed at which the heater of the AFP machine is moving during layup, determine a distance of the heating surface to the laminate surface at a location based on the distance data from the at least one sensor, and adjust an amount of power for the heater based on the distance and the speed at the location.

12. The system of claim 11 wherein:
the controller is configured to identify an average distance of the heating surface to the laminate surface at the location, based on the distance data, and select the amount of power based on the average distance.

13. The system of claim 11 wherein:
the controller is configured to identify a minimum distance of the heating surface to the laminate surface at the location, based on the distance data, and select the amount of power based on the minimum distance.

14. The system of claim 11 wherein:
the controller is configured to adjust the amount of power to heat the laminate surface to a predetermined temperature, regardless of distance between the heating surface and the laminate surface.

15. The system of claim 11 wherein:
the controller is configured to adjust the amount of power to heat the laminate surface to a predetermined temperature, regardless of distance between the heating surface and the laminate surface.

16. The system of claim 11 further comprising:
a compaction roller that compacts tows onto the laminate.

17. The system of claim 11 wherein:
the heater comprises electrically resistive filaments that generate infrared radiation in response to applied current.

18. The system of claim 11 wherein:
the heater comprises a heating surface via which heat is radiated.

19. The system of claim 11 wherein:
the controller is configured to limit the amount of power applied by the heater, based on a minimum shortest path distance between a heating surface of the heater and the laminate.

20. The system of claim 11 wherein:
the controller-is configured to access a heating profile that includes predefined values for the amount of power, based on distance and speed.

* * * * *